Dec. 11, 1951   J. H. HARTMAN   2,578,630
VALVE SHANK PROTECTOR
Filed May 31, 1949
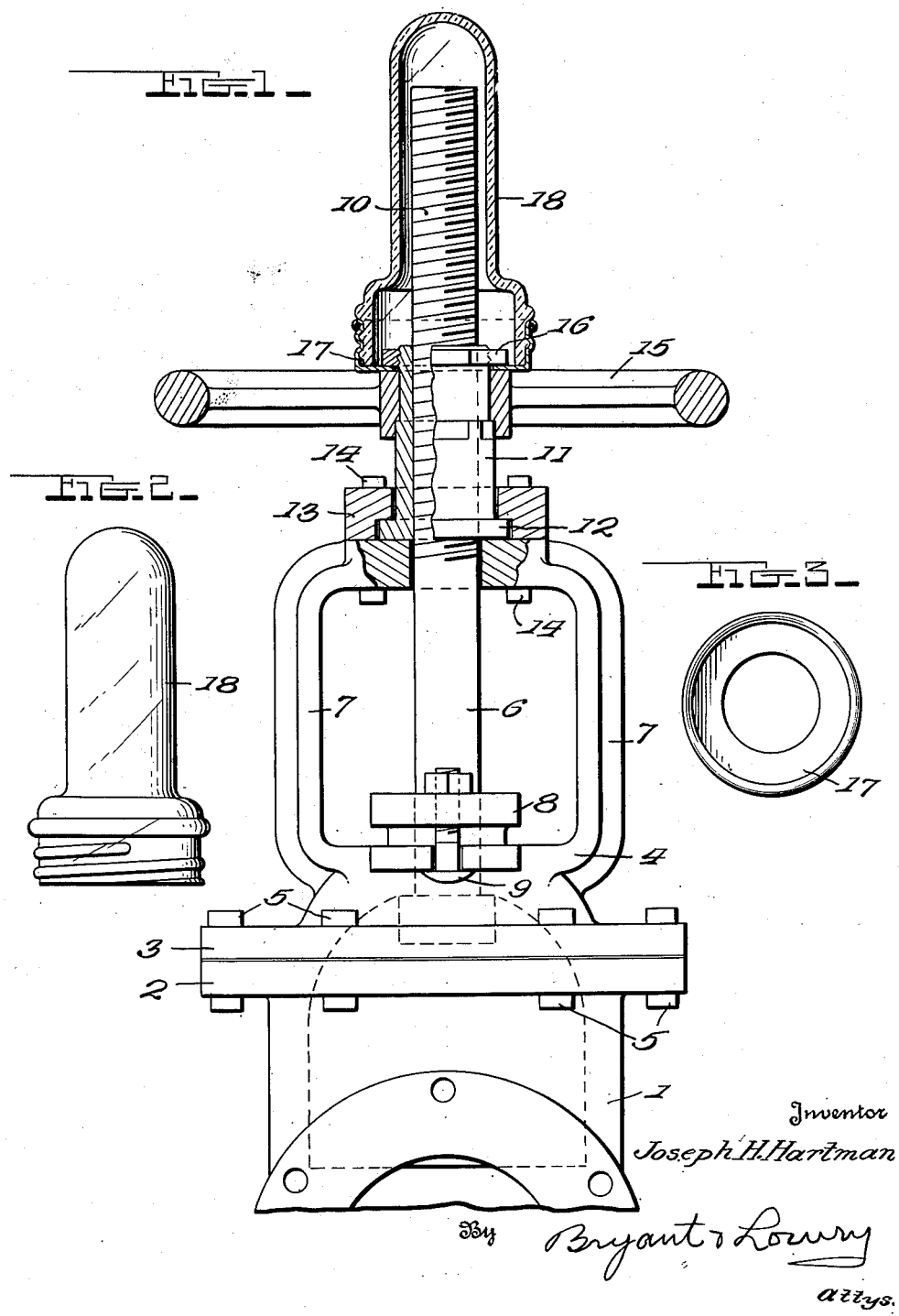
Inventor
Joseph H. Hartman
By Bryant & Lowry
attys.

Patented Dec. 11, 1951

2,578,630

UNITED STATES PATENT OFFICE 2,578,630

VALVE SHANK PROTECTOR

Joseph H. Hartman, Norristown, Pa.

Application May 31, 1949, Serial No. 96,313

2 Claims. (Cl. 251—150)

This invention relates to means for protecting the exposed end of an adjustable threaded shank, such as a valve shank for certain types of valves or similar mechanisms that may be subject to excessive wear due to the accumulation of grime and dirt or chemicals thereon, particularly in the working threads of the adjustable valve shank.

The object of this invention is to provide means adaptable for attaching over the end of an exposed adjustable shank so as to enclose said end and prevent the grime and dirt from working into and between the adjustable shank and its cooperating parts.

A further object is to provide a container loosely fitting over the exposed end of an adjustable shank, such as the threaded end of a valve shank which is operated by a swivelled nut having a hand wheel for moving said shank in or out by screw action between said nut and the thread on the shank, which is restricted against turning.

A further object is to provide a support on the swivelled nut of the above defined valve, on which the open end of said container may be mounted.

A further object is to make the above mentioned support in the form of a screw cap for the threaded open end of said container so that the latter may be readily installed over said shank by screwing it into said cap.

A further object is to make said container of transparent material so that the shank may be inspected without removal of the protective container.

Other and more specific objects of this invention will appear in the following detailed description of one form of the device as applied to the valve shank of an illustrative type of valve, having reference to the accompanying drawing, wherein:

Figure 1 is an assembly view partly in section of this device mounted on an illustrative form of valve to which it may be applied;

Figure 2 is an elevational view of the container portion of said device; and

Figure 3 is a bottom view of the screw cap.

A gate type valve is shown here for the purpose of illustration because it may have an adjustable shank such as referred to above.

The valve head is shown in dotted lines in the casing 1 which has a flange 2 on top, to which is attached the flange 3 of a yoke member 4 by means of bolts 5. The valve shank 6 passes through said yoke member between its leg portions 7 and is provided with a packing gland 8 where it passes into the valve casing through the bottom of the yoke member. The packing gland 8 is adjusted by a pair of bolts 9.

The outer end of the valve shank is threaded through a swivelled nut 11 rotatably mounted in the outer end of the yoke member. For this purpose the nut has a flange 12 freely mounted in the flange guide or bearing formed by the counterbored collar 13 fixed to the yoke by bolts 14.

A handwheel 15 is splined onto the nut 11 for turning the nut to operate the valve. The valve shank 6, being threadedly engaged with said nut, and being restricted itself against rotation since it is fixed to the gate valve head which is not rotatable, is therefore moved axially when the nut is turned to either open or close the valve.

The handwheel is held firmly on the nut 11 by means of the lock nut 16 threaded to the outer end of nut 11. A threaded cap 17, preferably of metal, having a circular cutout in the center is placed in an inverted position on top of the handwheel under lock nut 16. A container 18, which may be of glass or some transparent plastic, shaped as shown, and having its open end threaded to match the thread in the cap 17, is mounted over the exposed threaded end of the valve shank by screwing it into the cap. Thus the container is mounted to form a protective enclosure for the end of the shank and its cooperating nut to prevent grime and dirt from working into the threads of these parts.

Obviously, additional protective means, such as disclosed in my co-pending application filed at the same time and entitled Valve Protector, for enclosing the portion of the valve shank 6 which extends within the yoke, may be used here, if desired, in addition to the container 18.

The container 18 may be made of light sheet material such as Pyrex, aluminum, steel, zinc, tin or any other suitable composition, depending on its conditions of use. An acid or chemical resistant composition would obviously be preferred for use around chemical apparatus.

Many obvious modifications in form and materials of this device to suit requirements may be made without departing from the spirit and scope of the present invention, as defined in the appended claims.

What is claimed is:

1. In association with a valve actuating means of the type having a hand wheel and a central mounting hub, a sleeve-like nut extending through said hand wheel hub, coacting abutment shoulders on the lower end of the hub and said sleeve-like nut, a lock nut on the outer end of said sleeve-like nut and engaged with said hub for securing said wheel and said sleeve-like nut together, and a screw extending through said sleeve-like nut, a cap having an annular body portion and a continuous side wall, said annular portion being disposed transversely radially to the axis of the screw and surrounding said sleeve-like nut and being clamped against the hub of said hand wheel by means of said lock nut, said continuous side wall extending outwardly away from said hand wheel, a protecting container surrounding the outer portion of said screw and having a closed outer end, said container having its inner end closed by said cap, and coacting means on said inner end of said container and said side wall of said cap for detachably securing said container to said cap.

2. A structure as specified in claim 1; said coacting means on said inner end of said container and said side wall of said cap consisting of screw threads, permitting detachment of said container by rotating it with respect to said cap.

JOSEPH H. HARTMAN.

REFERENCES CITED

The following references are of record in the file of this patent:

UNITED STATES PATENTS

| Number | Name | Date |
|---|---|---|
| 974,055 | Halyburton | Oct. 25, 1910 |
| 1,652,510 | Allen | Dec. 13, 1927 |
| 1,664,694 | Lovvorn | Apr. 3, 1928 |
| 1,966,209 | Miller | July 10, 1934 |
| 1,990,197 | Mohr | Feb. 5, 1935 |
| 2,295,774 | Corydon | Sept. 15, 1942 |